United States Patent [19]
Ohishi et al.

[11] Patent Number: 5,752,092
[45] Date of Patent: May 12, 1998

[54] CONTROL UNIT FOR A VIBRATION COMPENSATION DEVICE FOR USE IN AN OPTICAL IMAGING SYSTEM

[75] Inventors: Sueyuki Ohishi, Tokyo; Nobuhiko Terui, Ichikawa, both of Japan

[73] Assignee: Nikon Corporation, Tokyo, Japan

[21] Appl. No.: 377,607

[22] Filed: Jan. 25, 1995

[30] Foreign Application Priority Data

Apr. 27, 1994 [JP] Japan ................................ 6-090325

[51] Int. Cl.$^6$ ............................................ G03B 17/00
[52] U.S. Cl. ............................................ 396/53
[58] Field of Search ........................ 354/410, 400, 354/402, 430; 348/208; 359/557; 396/52–57, 219

[56] References Cited

U.S. PATENT DOCUMENTS

| | | | |
|---|---|---|---|
| 5,398,132 | 3/1995 | Otani | 359/557 |
| 5,438,360 | 8/1995 | Edwards | 348/208 |
| 5,450,126 | 9/1995 | Nishida | 348/208 |

FOREIGN PATENT DOCUMENTS

| | | |
|---|---|---|
| 2113751 | 12/1977 | Germany. |
| 7-248517 | 9/1995 | Japan. |
| 7-321655 | 12/1995 | Japan. |
| 8-16365 | 1/1996 | Japan. |

*Primary Examiner*—D. Rutledge

[57] ABSTRACT

A photographic device having a vibration compensation device which drives a correcting lens perpendicular to an optical axis to compensate for vibrations detected by a vibration detection circuit. The analog output of the vibration detection circuit is converted into a digital signal by an A/D converter having at least 10 bits of resolution and at least a 2 ms sampling rate. A one-chip microcomputer calculates the correcting lens target velocity based on the output of the A/D converter. The one-chip microcomputer is provided with a built-in multiplying function able to handle the multiplication of signed 8-bit and 16-bit data.

19 Claims, 9 Drawing Sheets

CONTROL UNIT FOR A VIBRATION COMPENSATION DEVICE FOR USE IN AN OPTICAL IMAGING SYSTEM

BACKGROUND OF THE INVENTION

1. Field of the Invention

The present invention relates to an optical imaging system, such as a still camera or a video camera and the like, having a vibration compensation device for correcting for blur, and in particular, relates to a control unit for a vibration compensation device which has the ability to multiply a 16 bit signed number by a 16 bit unsigned number.

2. Description of the Related Art

In known photographic devices, such as cameras and camcorders, equipped with a vibration compensation device it has been proposed to suppress image blur by detecting vibrations with a vibration detection circuit, for example an angular velocity sensor and the like, and, based on the detected vibrations, to move the optical axis of a photographic optical system in compensation. For example, the optical axis may be caused to move by causing a shift of a correcting lens, which is a part of the photographic optical system. Driving, i.e., moving, of the correcting lens is performed by actuators, for example motors or the like. In the case of a motor, the rotation of the motor is reduced in speed by gears, or the like, and the rotary motion of the gears is converted into rectilinear motion, using a feed screw mechanism or the like, to drive the lens.

FIG. 1 is a block diagram of a typical photographic vibration compensation device in accordance with the prior art. A vibration detection circuit detects vibrations in the camera, and outputs an analog signal, proportional to the angular velocity of the detected vibrations, to an A/D ("Analog/Digital") converter 10. The analog output of the vibration detection circuit 5 is connected to an A/D conversion input (A/D input) of the A/D converter 10 and converted to a digital signal. The digital signal is output to a CPU 1, which comprises a one-chip microcomputer capable of performing 8-bit×8-bit unsigned multiplication. The CPU 1 controls a motor 4, via a motor drive circuit 2, in accordance with the digital signal from the A/D converter 10. The rotation of the motor 4 is converted into rectilinear motion and shifts a correcting or compensating lens 8, which is part of the photographic lens system (comprising lenses 6, 7, 8 and 9), in a direction perpendicular to the optical axis, thereby causing a change of the optical axis. A correcting lens position and velocity detection circuit 3 detects the position and the shift velocity of the correcting lens 8. The position and shift velocity of the correcting lens 8 are provided as feed back to the CPU 1. Normally, the correcting lens 8 is shifted along two axes, an X and a Y, forming a plane perpendicular to the optical axis of the photographic lens. However, as the constitution of the mechanisms for each axis are the same, only one axis is described herein.

In known vibration compensation devices, the A/D converter 10 has an 8-bit resolving power. Moreover, because it is necessary for the vibrations in the camera to be detected in real time, the output of the vibration detection circuit 5 is converted into a digital signal at a comparatively short predetermined sampling interval, for example 2 ms. The A/D converter 10 is supplied with an A/D conversion standard voltage, which dictates the time standard for A/D conversion. With the A/D conversion standard voltage as the standard, the output voltage of the vibration detection circuit 5 is converted into an 8-bit digital value (a decimal value of 0–255), and output to the CPU 1.

FIG. 2 is a chart showing the relationship between the voltage input to the A/D input and the A/D converted digital values. When the A/D input voltage is 0 V, the A/D conversion is 0; when a voltage is input which was the same as the A/D standard voltage, the A/D conversion result is 255. In other words, the interval from an input voltage of 0 V to the A/D conversion standard voltage is divided into 256 units, and the result of the A/D conversion is a decimal value in proportion to the A/D input voltage. For example, experiments show that the angular velocities associated with vibration in a lens shutter camera, due to shaking of the hands, is usually in a range of about from −20°/sec to +20°/sec. When that output of the vibration detection circuit 5 reaches an angular velocity of −20°/sec, the A/D converter 10 outputs 0 V. Further, when the output of the vibration detection circuit 5 indicates no vibrations, the A/D converter 10 outputs a voltage equal to ½ of the standard voltage of the A/D converter 10. Finally, when the output of the vibration detection circuit 5 indicates an angular velocity of +20°/sec, the output of the A/D converter 10 is the standard voltage of the A/D converter 10. Thus, A/D conversion is possible in a normal range of angular velocities of −20°/sec to +20°/sec.

In this case, an angular velocity of about 0.156°/sec corresponds to one quantization unit (1 LSB) of the A/D conversion value. In other words, an angular velocity of 0.156°/sec or less cannot be recognized by an A/D converter 10 of 8-bit resolving power. That is, a difference of angle of 0.156° in 1 second by calculation cannot be recognized on the image plane of the camera. Thus, if a photograph is taken with a photographic lens of focal length 105 mm at a shutter speed of ¼ second, a vibration equal to 105 mm×tan(0.156°) ×(¼ second)≈71µm cannot be sensed. In the case of a photographic lens having a long focal length, or in the case of an exposure lasting a second or more, the amount of vibration which cannot be sensed increases. Moreover, the actual outputs of the vibration detection circuit 5 are individually scattered, and even if a fixed angular velocity is reached, the output values of the vibration detection circuit 5 is not a constant value.

Cameras are known in which the vibration detection circuit 5 comprises an angular velocity sensor whose output is amplified by an operational amplifier. In such a case, based on the characteristics of the operational amplifier, there are many cases in which the range of outputs is only from a lower limit of about 1 V, to an upper limit, which is the electric supply voltage of about −1 V. For the above reasons, there is a large surplus of detected vibrations over the range of the A/D converter 10. For example, when the supply voltage of the vibration detection circuit 5 is 5 V, the standard voltage of the A/D converter is 5 V, the output range of the vibration detection circuit 5 is from 1 V to 4 V, and a 2.5 V output is obtained when at standstill. Thus, 1 LSB of the A/D converter 10 corresponds to an angular velocity of about 0.26°/sec. In such a case, if a photographic lens having a 105 mm focal length is used at a shutter speed of 1.4 second, a 119 µm vibration in the image plane is undetectable. Normally, using a silver salt based film, in order to obtain a photograph without blur, a generous estimate of permissible amount of permissible vibration in the image plane, is about 50 µm. In the above example, the amount of undetectable vibration is much larger than 50 µm, which makes it impossible to produce a blur free image.

Japanese Patent Application No. 6-40023 discusses the resolving power of an A/D converter and the vibration correction accuracy of an A/D converter. In order to minimize the errors due to the resolving power of the A/D converter 10, known video cameras use a vibration detection circuit in conjunction with a 10-bit resolving power A/D converter. By increasing the resolving power of the A/D converter from 8 bits to 10 bits, 1024 divisions are obtained, as opposed to 256 divisions. This produces a 4-fold increase in resolving power, i.e., the angular velocity corresponding to 1 LSB of the A/D converter is about 0.065°/sec. Using a 10 bit A/D converter, the undetectable error in the image plane, when photographing with a 105 mm lens at a shutter speed of 1.4 second, can be reduced to about 30 μm. An even higher resolution of detection vibration can be obtained by using an A/D converter having a resolving power of 12-bit or higher. It is clear that it is desirable for the resolving power of the A/D converter to be 10-bits or more. The same rationale also applies to the circuitry used to control of the movement of correcting lens 8.

FIG. 3 is a flow chart showing the control of a correcting lens 8. A vibration correction control timer interruption process is performed repeatedly at a predetermined time interval in the program process of the CPU 1, for example every 2 ms. The process is commenced from step S500, thereafter in step S501 the output of the analog vibration detection circuit 5 is converted to digital by the A/D converter 10. In step S502, the target velocity VC of the correcting lens 8 is calculated based on the digital values obtained in step S501. The correcting lens target velocity VC is calculated, for example, using Equation 1.

Equation 1

$$VC = K \times \{(A/D\ conversion\ value) - (A/D\ conversion\ value\ corresponding\ to\ zero\ angular\ velocity)\} \quad (1)$$

In equation 1, the A/D conversion value corresponding to zero angular velocity is equal to the A/D conversion value of the output of the vibration detection circuit 5 when the camera is at standstill. The coefficient K is termed an A/D value—correcting lens target velocity conversion coefficient. In step S503 the drive amount of the motor 4 is calculated based on the velocity of the correcting lens 8, as determined from the correcting lens target velocity VC and the output of the correcting lens position and velocity detection circuit 3. In step S504, the motor 4 is driven, via the motor drive circuit 2, by the drive amount calculated in step S503. Thereafter, in step S505, the vibration correction control timer interruption process ends.

In order to detect vibrations with acceptable accuracy, the resolution of the A/D converter 10 has to be at least 10-bits or more. 8-bit does not provide enough accuracy. Known photographic devices, and in particular, silver salt film cameras and the like, do not consider the effect of using a one-chip microcomputer as a vibration compensation control unit. A problem arises in that the one-chip microcomputers, which have been used in many silver salt film cameras, can only calculate 8 bits×8 bits.

FIG. 4 is a flow chart showing an operating process for calculating the compensating lens 8 target velocity. The process starts from step S600 when it is called from step S502 in FIG. 3. In step S601, an A/D value, corresponding to where the angular velocity equals zero, is subtracted from the A/D conversion value obtained in step S501. In step S602 it is determined whether the variable A is positive or negative. If the variable A is positive, a variable B is set to the value of the variable A in step S603. If the variable A is negative, the variable B is set to equal the absolute value of the variable A in step S604. In either event the process proceeds to step S605. In step S605, the A/D conversion values, the A/D conversion value corresponding to the angular velocity zero, and the variable B, are translated into data having a 16-bit length. The variable B is separated into an upper 8-bit data (1 byte) b1 and a lower 8-bit data (1 byte) b0. Thereafter, in step S606 the A/D value—correcting lens target velocity conversion coefficient K is separated into an upper 8-bit data k1 and a lower 8-bit data k0, and the process proceeds to step S607. In step S607, the respective 8-bit data, as separated in steps S605 and S606, are used to determine the results of Equation 2. During this calculation four multiplications are performed, thereby effecting a 16 bit×16 bit calculation.

Equation 2

$$C = (b1 \times k1) \times 2^{16} + (b0 \times k0 \times 2^8 + (b1 \times k0) \times 2^8 + (b0 \times k) \quad (2)$$

FIG. 5 is a diagram showing a method for the calculation of Equation 2. Firstly, the upper 8 bits of the result of b1×k1 are placed in a register c1, and the lower 8 bits in a register c2. Next, the upper 8 bits of the result of b0×k1 are placed in a register c3 and the lower 8 bits in a register c4. Thereafter, the upper 8 bits of the result of b1×k0 are placed in a register c5 and the lower 8 bits in a register c6. Finally, the upper 8 bits of the result of b0×k0 are placed in a register c7 and the lower 8 bits in a register c8. Thereupon, the 4th byte c12 of the result C (the lowest position byte) is equal to the value in the register c8. The 3d byte c11 of the result C is equal to the sum of registers c4, c6 and c7. The 2d byte c10 of the result C is equal to the carry value from the 3d byte c11 summed with the registers c2, c3 and c5. The first byte (the top position byte) c9 in the result C is the carry value from the 2d byte (the sum of the carry value from the 3d byte and c2, c3 and c5) summed with the register c1. Thus, the value of the 16-bit×16-bit calculation is found by four calculations of 8 bits×8 bits.

Referring, once again to FIG. 4, in step S608 it is once again determined whether the variable A is positive or negative. If the variable A is negative, the process proceeds to step S609 and the result C is set equal to the 2's complement of the result C, thereafter the process proceeds to step S610. If in step S608, the variable A is positive, the process proceeds to directly to step S610. Thus, when the variable A is negative, the 2's complement of the result C is used, because the CPU 1 cannot handle the addition of signed values. Consequently, when the variable A is negative in step S602, by only using the absolute value of A, the calculation in steps S605 through S607 are performed using positive values only. Thereafter, in step S608, the result C is revised to the proper signed value. Next in step 610, the correcting lens target velocity VC is set equal to the result C. Finally, in step S611 the correcting lens target velocity calculation process ends, and the routine returns to step S503 in FIG. 3.

FIG. 6 is a graph of an example of the angular velocity ω versus time t of vibration in a compact camera due to hand vibrations. Under normal use, the range of angular velocities due to hand vibrations in a compact camera occur at about a frequency of 1–15 Hz, with a maximum angular velocity of ±20°/sec. Specifically, FIG. 6 is a graph of a sinusoidal vibration having a frequency f=10 Hz, and an amplitude ω0=20°/sec. The time change of the angular velocity is given by Equation 3.

Equation 3

$$\omega = \omega 0 \times \sin(2 \times \pi \times f \times t) \quad (3)$$

FIG. 7 is an enlarged graph of the point in FIG. 6, at which the change of the angular velocity ω is largest, that is, in the neighborhood of ω=0 and at time t0. In this example, the vibration correction control timer interruption process is performed at 10 ms intervals, in other words, the sampling interval of the A/D conversion, as set forth in step S501 in FIG. 3, is performed in an interval of 10 ms. The A/D conversion performed in the vibration correction control interruption process of S501 is first performed at time t1. Next, at a time t2, 10 ms having elapsed from time t1, the A/D conversion is once again carried out for the next cycle. The amount of change $\Delta\omega$ of the angular velocity $\omega$ during this 10 ms (between t1 and t2) is approximately equal to 12.36°/sec.

Because the CPU 1 recognizes the vibration by the A/D conversion of the output of the vibration detection circuit 5, at the timing t1 in step S501, the CPU 1 cannot recognize the change of angular velocity until it receives the new A/D converted vibration at the next timing t2. Because of this, a recognition error of angular velocity, on the average about $\Delta\omega/2 \approx 6.18°$/sec, arises between t1 and t2. Thus, for example, the undetectable error in the image plane of a camera having a photographic lens of 105 mm focal length would be: 105 mm×tan (6.18°)×(10 ms/1000 ms)≈114 µm. Moreover, in the case of a photographic lens of 300 mm focal length, the error would be about 325 µm. If the sampling interval of this A/D is shortened to a 2 ms interval, the amount of change of angular velocity $\Delta\omega$ would be approximately 2.51°/sec, and the undetectable error in the image plane of the camera in the case that a photographic lens of 105 mm focal length would be about 4.6 µm. If an interval of 2 ms was used with a photographic lens of 300 mm focal length, the undetectable error would be about 13.1 µm.

The calculations outlined above are estimates using a vibration having an amplitude of angular velocity of 20°/sec of 10 Hz. However, it must be recognized that there are also cases in which greater errors arise, i.e., vibration having an angular velocity greater than 20°/sec of 10 Hz, or having a frequency greater than 10 Hz. Consequently, it is considered desirable to perform the sampling for the A/D conversion within an interval of about 2 ms.

To summarize, the following factors directly bear on the ability to accurately compensate for vibrations in a photographic device: the resolving power of the A/D converter must be at least 10 bits; the sampling interval of the A/D conversion must be 2 ms or less; the resolution of the calculation of the target velocity of the correcting lens 8 from the A/D conversion result must be high; and the operating precision corresponding to the A/D converter must also be high. However, there are problems with known vibration correction systems that attempt to satisfy these criteria.

Firstly, in order to obtain the correction lens target velocity in the calculation of the correction lens target velocity, multiplication of the corresponding 8-bit data is repeated 4 times, which requires a complicated process involving taking the total of the respective results by a predetermined method. In addition, the CPU 1 has to calculate the drive amount of the motor 4, in step S503 of FIG. 3, and thereafter the CPU 1 has to drive the motor 4, in step S504. Further, the CPU 1 must perform the calculation on two axes to control the correcting lens 8. In addition, as the A|D converter 10 is operating at a sampling rate of 2 ms, the CPU 1 has to perform all of the required calculations and control in less than 2 ms. In other words, the CPU 1 has a very limited amount of operating time. Current known cameras have had to increase the sampling interval to provide enough time for the CP1 to perform the necessary calculation and control, thus decreasing the accuracy of vibration compensation.

Secondly, the process of calculating the target velocity of the correcting lens 8, as set forth in FIG. 4, becomes increasingly complicated if any attempt is made to increase the accuracy of the calculation when using a CPU1 having an 8-bit×8-bit multiplying function.

SUMMARY OF THE INVENTION

Accordingly, it is an object of the present invention to provide a simplified process of accurately calculating the target velocity of a correcting lens in a photographic vibration compensation device.

It is another object of the invention to provide a simplified process of accurately calculating the target velocity of the correcting lens by decreasing the time consumed in the calculation process in a photographic vibration compensation device.

It is yet a further object of the invention to provide an accurate and efficient multiplying function for a one-chip microcomputer for use in a camera having a vibration compensation function.

Additional objects and advantages of the invention will be set forth in part in the description which follows, and, in part, will be obvious from the description, or may be learned by practice of the invention.

Objects of the present invention are achieved in a control unit for a vibration compensation device for use in an optical imaging system comprising a multiplying unit adapted to multiply 8-bit data by 16-bit data.

Objects of the present invention are also achieved in a vibration compensation device for an optical imaging system comprising a correcting lens adapted to change the optical axis of the optical imaging system, a correcting lens drive unit adapted to move the correcting lens perpendicular to the optical axis of the optical imaging system, a vibration detection circuit to detect vibrations in the optical imaging system and output a signal indicative of the vibrations, and a control unit adapted to control the correcting lens drive unit to move the correcting lens to compensate for vibrations detected by the vibration detection unit, the control unit being equipped with a multiplying unit adapted to multiply at least 8-bit data by 16-bit data.

Objects of the present invention are also achieved in a photographic device having an optical axis change device to change the optical axis of a photographic lens, a vibration detection circuit, to detect vibration occurring in the photographic device, a CPU having a multiplying function, for performing multiplication of at least 8-bit data by 16-bit data, to calculate target displacement positions or target displacement velocities or target displacement accelerations for the optical axis change device based on the output of the vibration detection device.

Objects of the present invention are also achieved in a photographic device having an optical axis change device to change the optical axis of a photographic lens, a vibration detection circuit to detect vibration occurring in the photographic device, a CPU having a multiplying function, for performing multiplication of at least 16-bit data by 16-bit data, to calculate target displacement positions or target displacement velocities or target displacement accelerations for the optical axis change device based on the output of the vibration detection device.

Objects of the present invention are also achieved in a photographic device having an optical axis change device to change the optical axis of a photographic lens, a vibration detection circuit to detect vibration occurring in the photographic device, a CPU having a multiplying function, for performing multiplication of at least 8-bit signed data by 16-bit signed data, to calculate target displacement positions or target displacement velocities or target displacement accelerations for the optical axis change device based on the output of the vibration detection device.

Objects of the present invention are also achieved in a method of correcting for vibrations in an optical imaging system comprising detecting vibrations in the optical imaging system, outputting an analog signal indicative of the vibrations in the optical imaging system, converting the analog signal into a digital signal having at least 10 bits of resolution, transforming the digital signal into data having a length of 16 bits, determining a target velocity for a compensation lens based on the data by using a multiply function able to multiple 16-bit data by 16-bit data, detecting a current velocity of the compensation lens, determining a drive amount the compensation lens must be driven based on the target velocity and the current velocity, and driving the compensation lens based on the drive amount.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
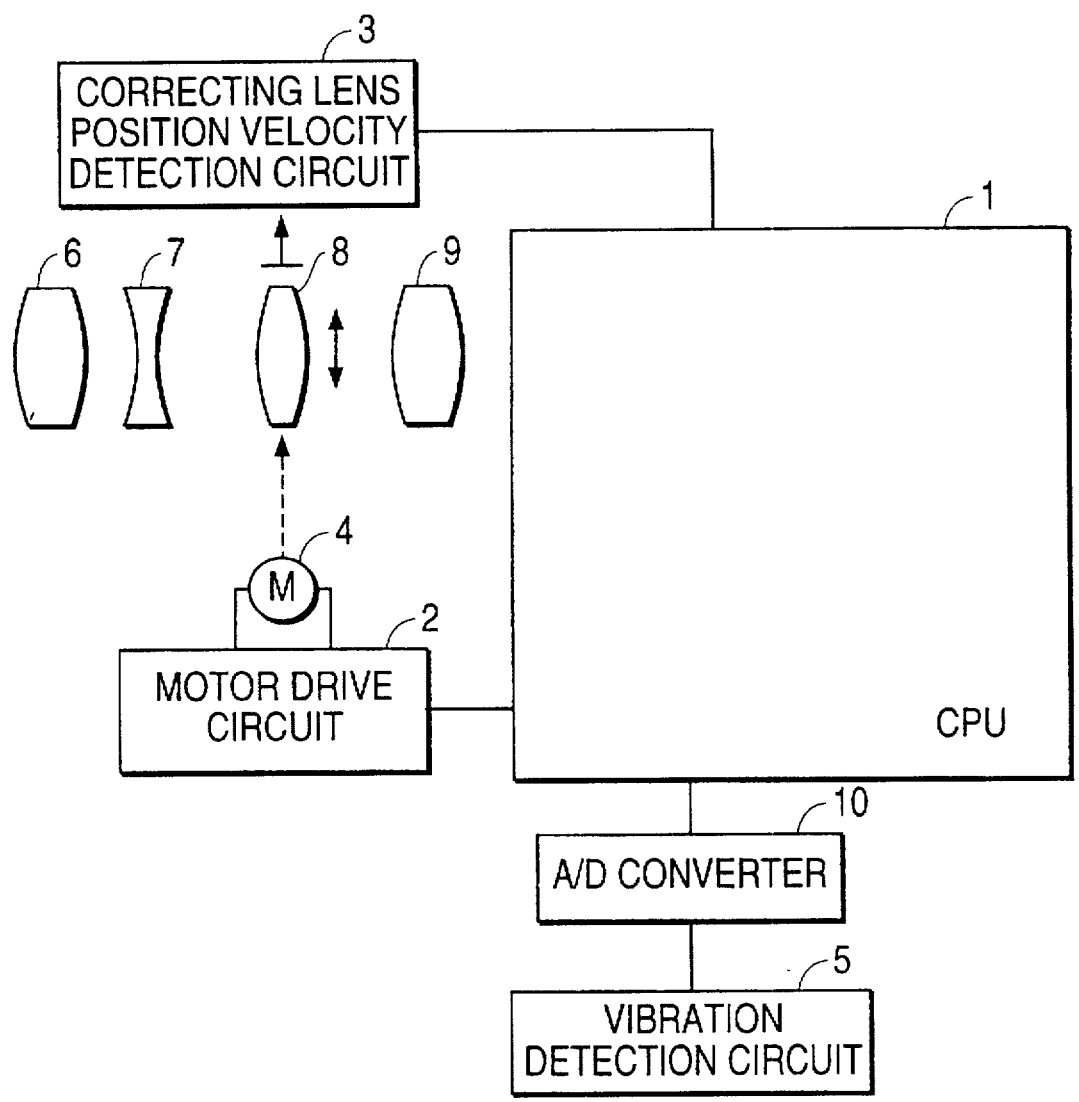
FIG. 1 is a block diagram showing a vibration compensation device in accordance with the prior art and for use in a preferred embodiment of the present invention.
Figure 2:
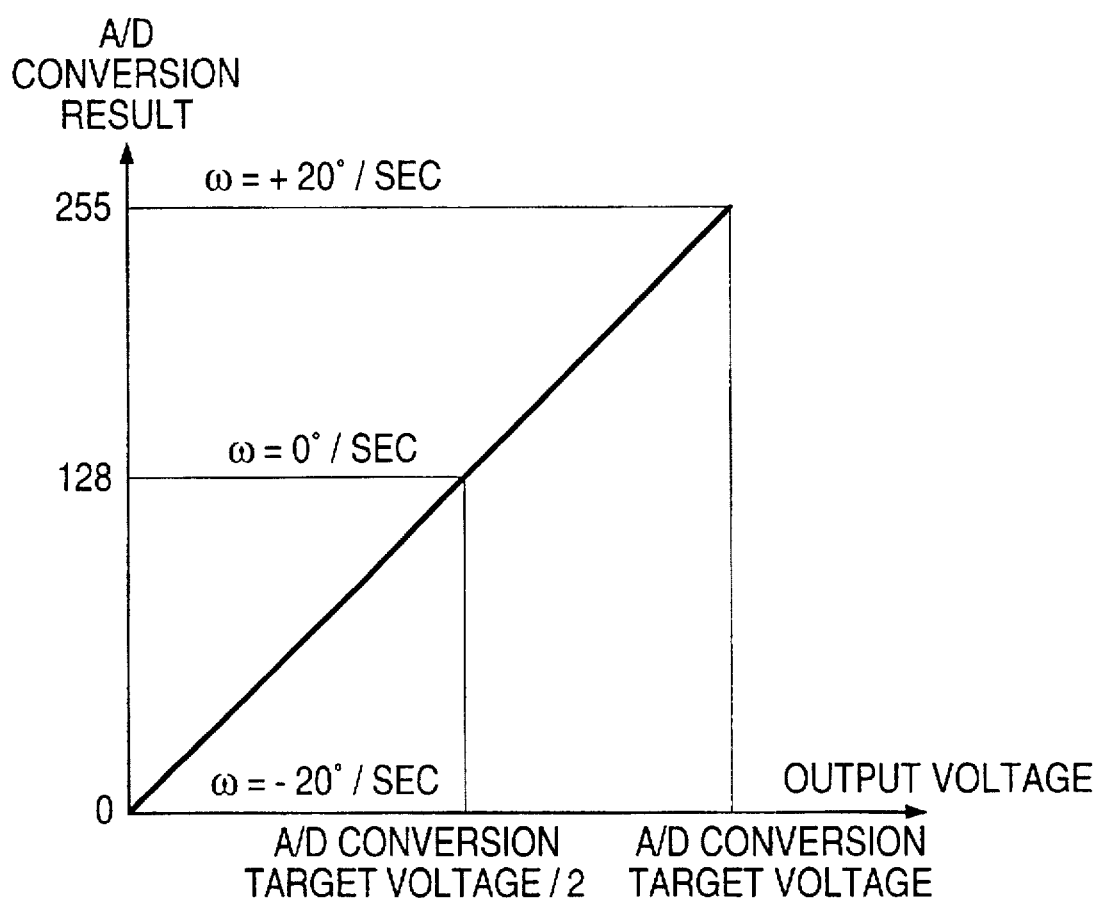
FIG. 2 is a graph showing the relationship of the A/D input voltage and the A/D conversion result in accordance with the prior art.

Reference will now be made in detail to the present preferred embodiments of the present invention, examples of which are illustrated in the accompanying drawings, wherein like reference numerals refer to like elements throughout.

FIG. 1 is a block diagram of a vibration compensation device for an optical imaging system, such as a camera, into which the preferred embodiments of the present invention can be incorporated.

In accordance with a first preferred embodiment of the present invention, the CPU 1 is a one-chip microcomputer which is provided with a signed multiplication function capable of multiplying signed 16-bit data by signed 16-bit data. This simplifies the calculation of the correcting lens target velocity VC and reduces the process time.

Figure 8:
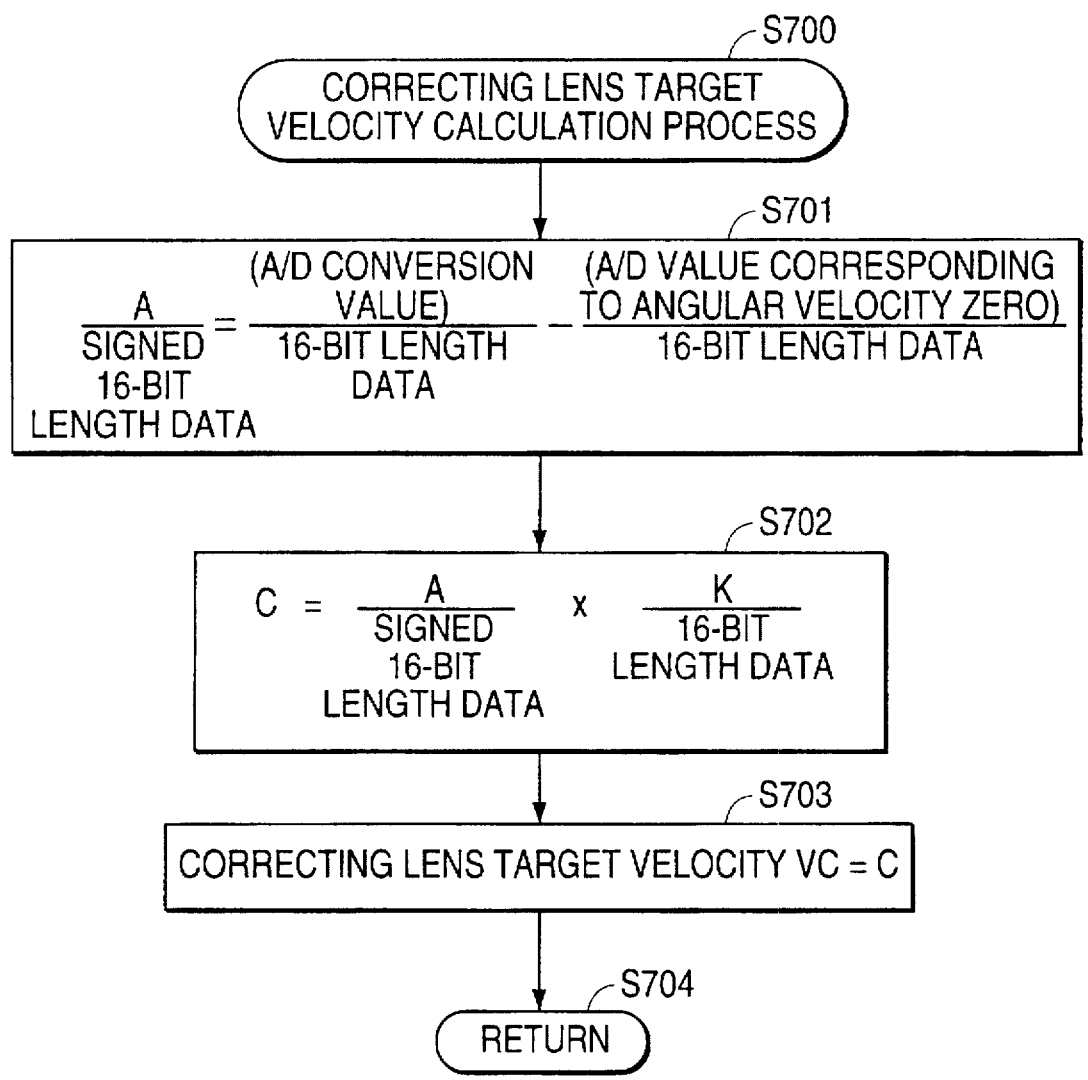
FIG. 8 is a flow chart showing an example of the operational process in accordance with a first preferred embodiment of the present invention.

FIG. 8 is a flow chart showing a correcting lens target velocity calculation process in accordance with the first preferred embodiment of the present invention. In accordance with the first preferred embodiment of the present invention, the correcting lens target velocity calculation process is called from step S502 in FIG. 3, and commences its process from step S700. The A/D value corresponding to a zero angular velocity is calculated in step S701 based on the A/D converted value obtained in S501, and is set in a variable A. The variable A and the A/D value correcting lens target velocity conversion coefficient K are multiplied in step S702, and the result is placed in the variable C. The variable C is then substituted into the correcting lens target velocity in step S703. Thereafter, the correcting lens target velocity calculation process ends in step S704, and the process returns to step S503 in FIG. 3.

In accordance with the first preferred embodiment of the present invention, the variable A, set in step S703, is signed 16-bit data. Further, the coefficient K, used in step S701 is unsigned 16-bit data. Because the CPU 1 is equipped with a multiplying function capable of handling both signed and unsigned 16-bit data, the necessary calculations in the correcting lens target velocity calculation process are simplified in comparison with the prior art. Firstly, it is unnecessary to determine whether the variable A is positive or negative, as is done twice in the process in accordance with the prior art. Secondly, the process of calculating the absolute value of the variable A is unnecessary. Thirdly, the separation of the multiplication data into upper 8-bit data and lower 8-bit data, performing the four multiplications of the related data, and obtaining the sum by a predetermined method, is unnecessary using a 16-bit by 16-bit multiplication. Fourthly, the process of calculating a two's complement when the variable A holds a negative value is unnecessary. In accordance with the first preferred embodiment of the present invention, the correcting lens target velocity calculation process is simplified in comparison with the prior art case, and because a 16 bit×16 bit signed multiplying function is built into the CPU 1, the process is both simplified and shortened while maintaining increased accuracy.

Although the first embodiment of the present invention has been described with respect to a specific configuration, it will be recognized that the first embodiment is not limited to the specific configuration. For example, although the first embodiment has been described with respect to the use of multiplying function for signed 16-bit data by unsigned 16-bit data, one of ordinary skill in the art will recognize that a multiplying function of signed 16-bit data by signed 16-bit data may be used. In such a case, even though the A/D value—correcting lens target velocity conversion coefficient K is positive data, it is handled as signed data.

Further, while the first preferred embodiment has been described with respect to the vibration detection circuit 5 detecting the angular velocities of vibrations using a pair of angular velocity sensors, the first preferred embodiment is not limited to these. For example, sensors may be used which outputs signals indicating either the acceleration or the position of the correcting lens 8. Where the output of the vibration detection circuit 5 indicates acceleration, the target velocity of the correcting lens 8 can be calculated, and the correcting lens 8 can be controlled so that it attains a target acceleration. The aforementioned A/D value—correcting lens target velocity conversion coefficient K would be a coefficient to facilitate the conversion of the A/D values to the target acceleration of the correcting lens 8. The output may also be integrated, to give an indication of the velocity, and the target velocity may be calculated, as set forth above. When the output of the vibration detection circuit 5 indicates the position of the correcting lens 8, the target velocity of the correcting lens 8 may be calculated from the output of the vibration detection circuit 5, and the correcting lens 8 may be controlled so as to attain its target position. In this case, the A/D value—correcting lens target value conversion coefficient K is a coefficient such that the target velocity of the correcting lens 8 can be calculated from the A/D values.

Moreover, while the first preferred embodiment has been described with respect to the use of a compensating lens 8, a variable vertex angle prism or the like may instead be used. It is also possible to use a voice coil or the like instead of the motor 4.

Figure 9:
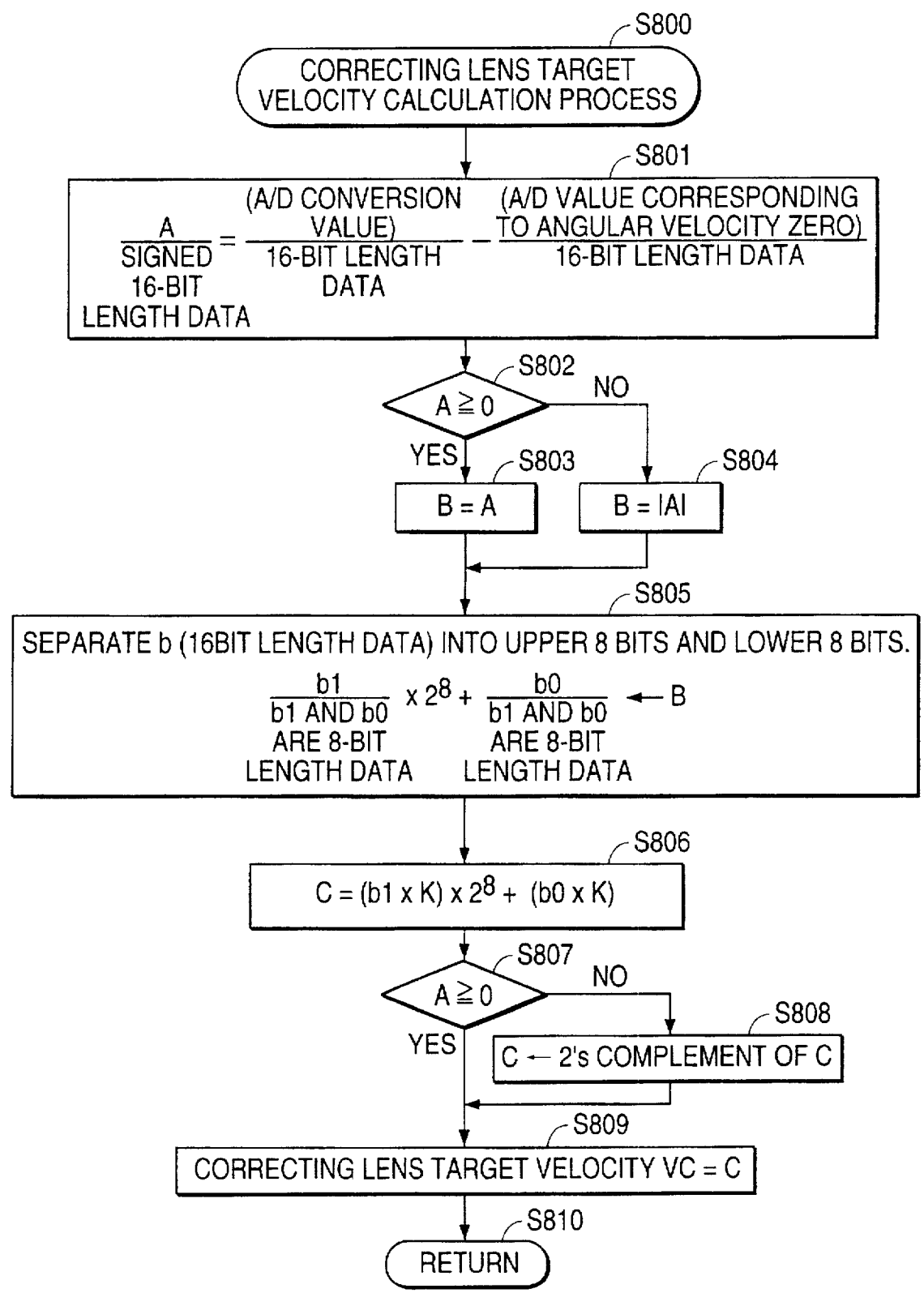
FIG. 9 is a flow chart showing an example of the correcting lens target velocity calculation in accordance with the second preferred embodiment of the present invention.

FIG. 9 is a flow chart showing a correcting lens target velocity calculation process in accordance with a second preferred embodiment of the present invention. In accordance with the second preferred embodiment of the present invention the CPU 1 is provided with a multiplication function for use with unsigned 16-bit data×unsigned 8-bit data.

Figure 3:
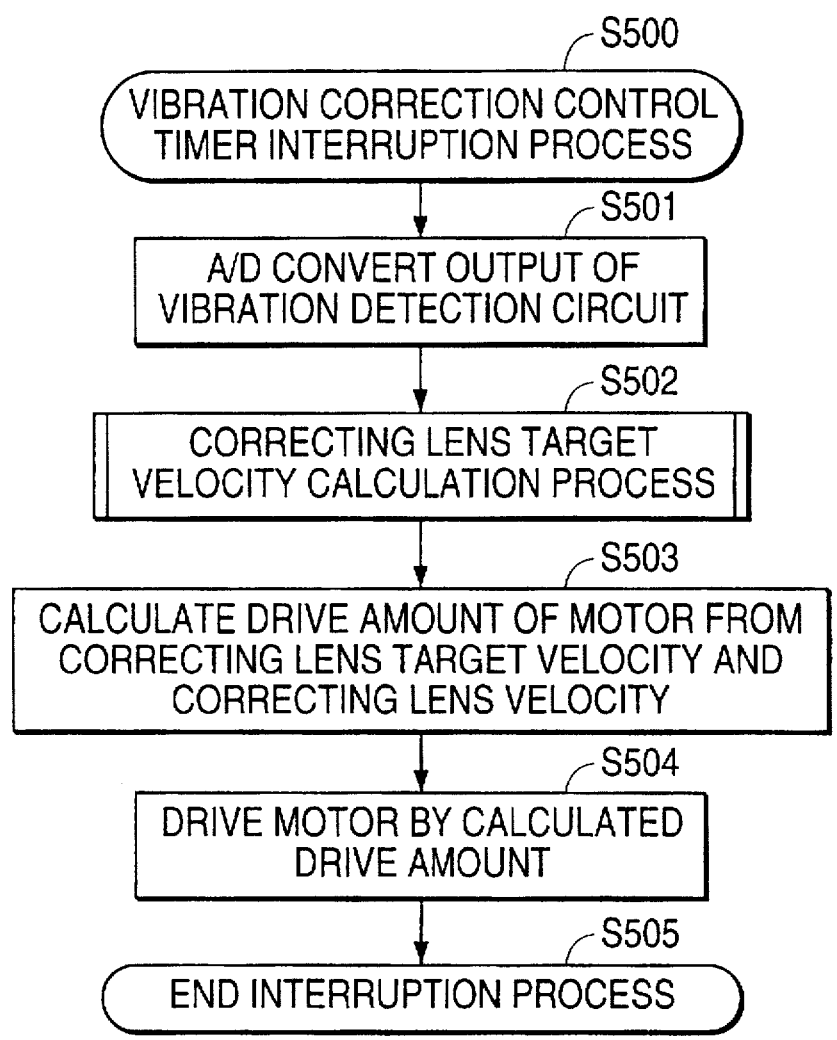
FIG. 3 is a flow chart showing the vibration correction control timer interruption process in accordance with the prior art and for use in a preferred embodiment of the present invention.
Figure 4:
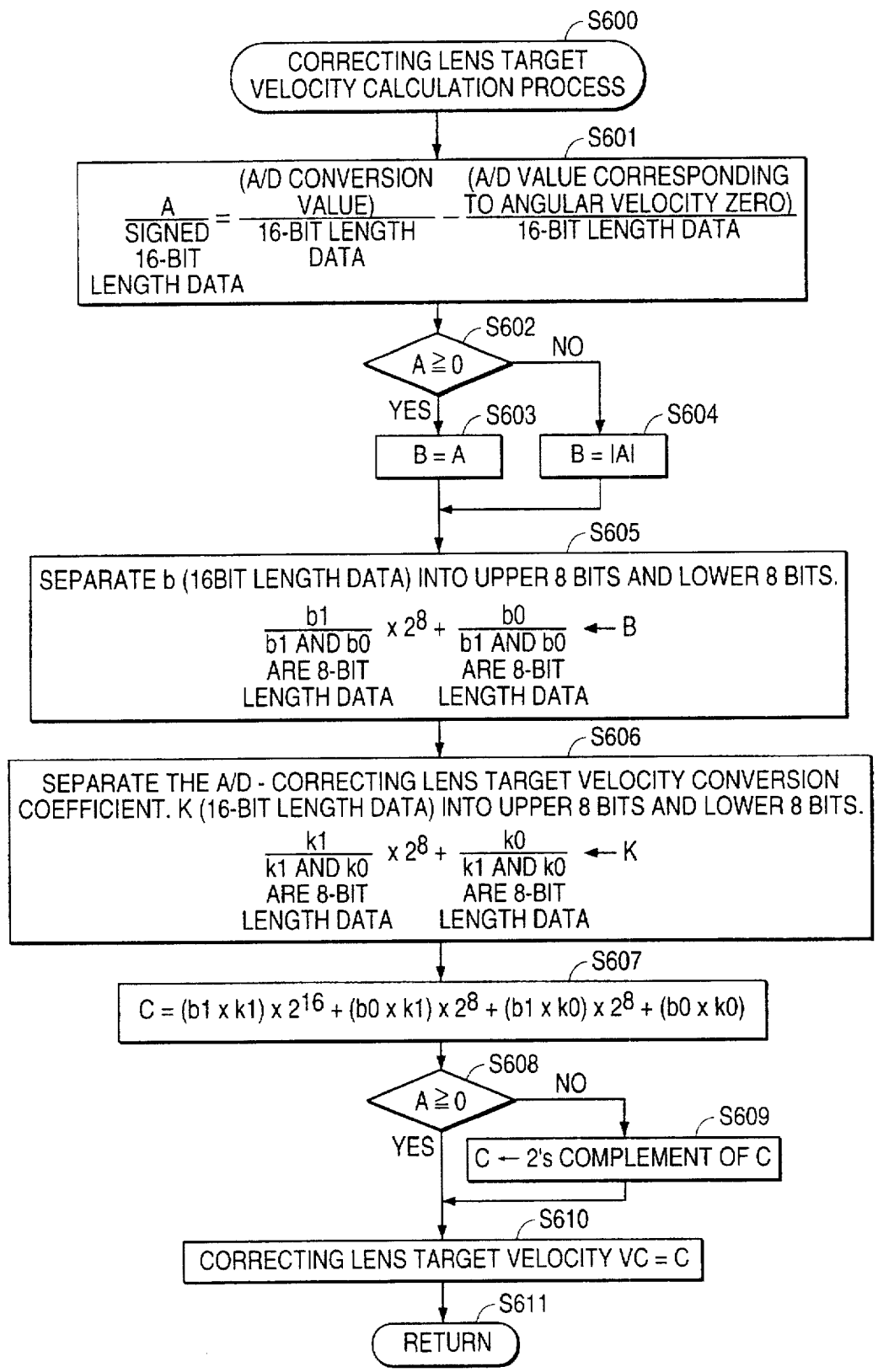
FIG. 4 is a flow chart showing an example of a correcting lens target velocity calculation process in accordance with the prior art.
Figure 5:
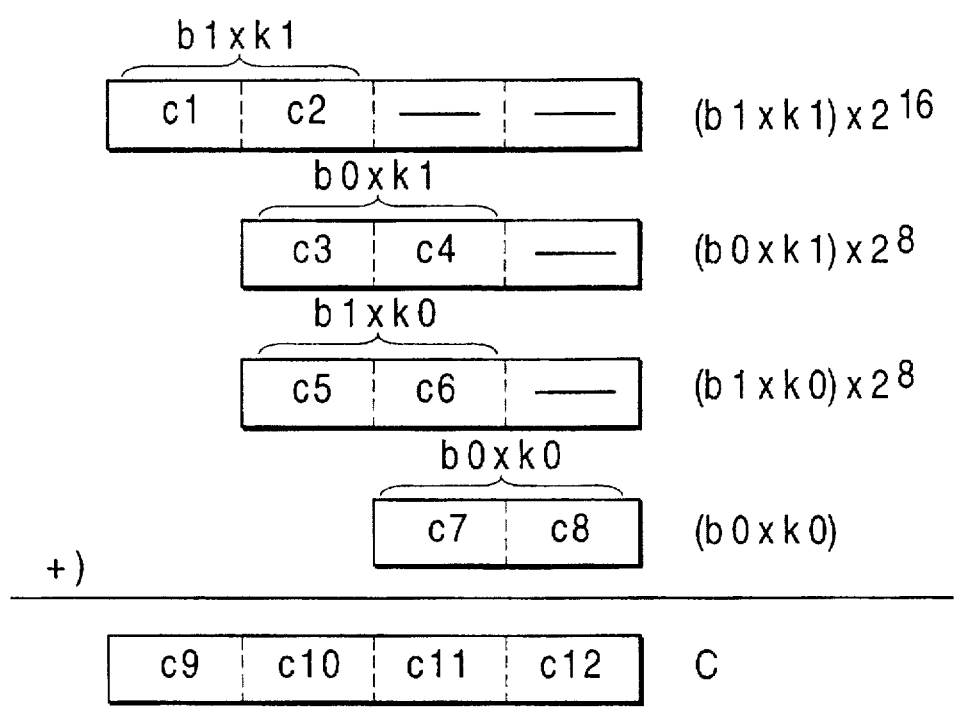
FIG. 5 is a diagram showing a method of calculating the correcting lens target velocity, in accordance with the prior art.
Figure 6:
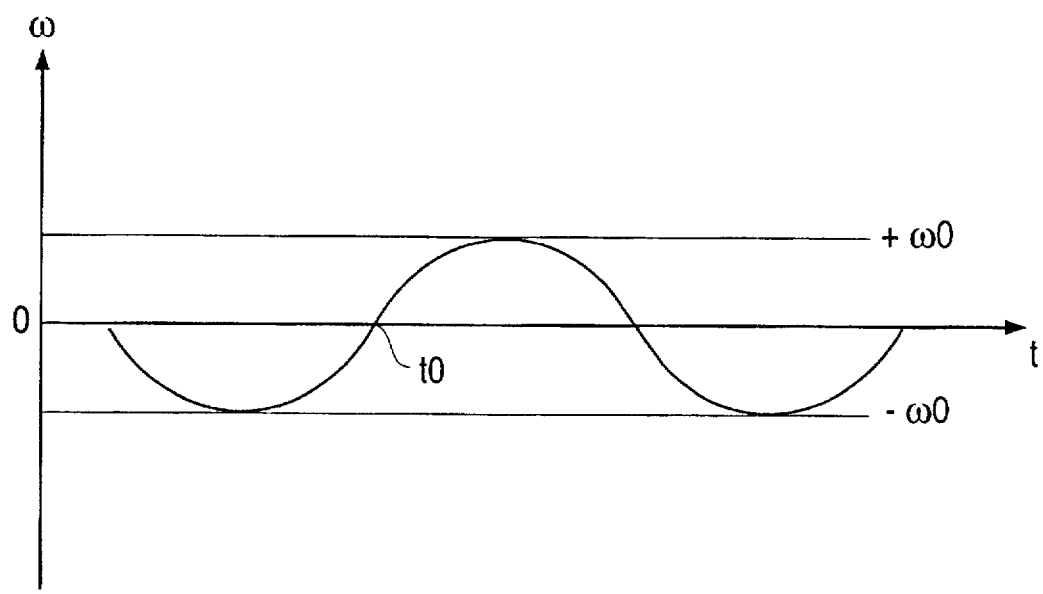
FIG. 6 is a graph showing the relationship between the angular velocity, due to vibrations, and time, in accordance with the prior art.
Figure 7:
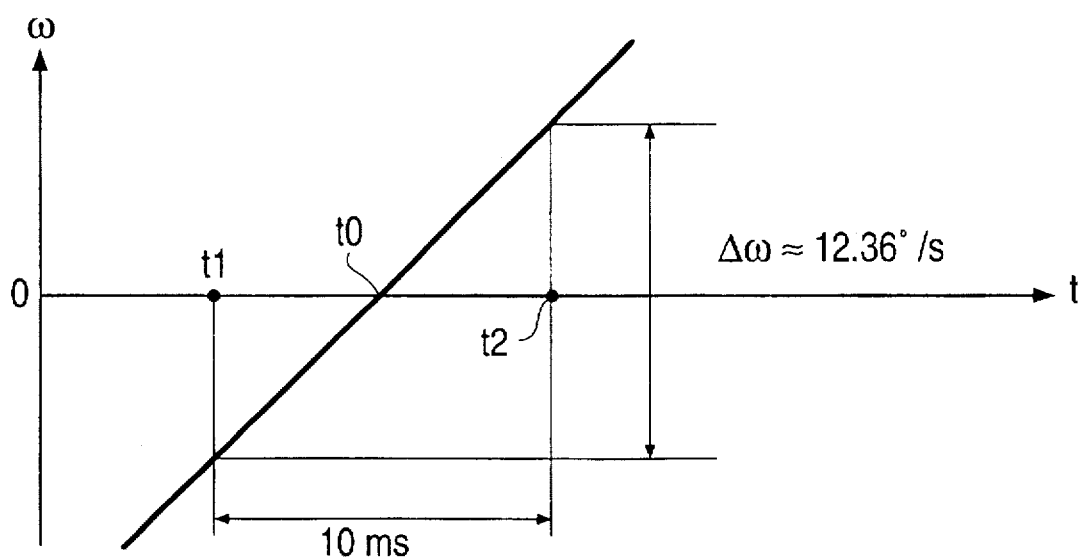
FIG. 7 is an enlarged graph at the time t0 of FIG. 3.

The correcting lens target velocity calculation process is called by step S502 in FIG. 3, and commences the process from step S800. In step S801, the A/D value corresponding to zero angular velocity is subtracted from the A/D conversion value, obtained in S501, and is placed in the variable A. In step S802, a determination is made as to whether the value in the variable A is positive. If the value in the variable A is positive, the value in the variable A is substituted into the variable B in step S803. If however the value in the variable A is negative, the absolute value of the value in the variable A is substituted into the variable B in step S804. In either event the process thereafter proceeds to step S805. In step S805, the variable B is separated into an upper 8 bits b1 and a lower 8 bits b0. Thereafter, in step S806, Equation 4 is calculated using the multiplying function of the CPU 1 for 8-bit data and 16-bit data, and the result of the calculation is substituted into the variable C.

Equation 4

$$C = (b1 \times K) \times 2^8 + (b0 \times K) \quad (4)$$

Next, in step S807 a determination is made as to whether the value in the variable A is positive. If the value in the variable A is positive, the process proceeds to step S809. If however the value in the variable A is negative, the two's compliment of the variable C is calculated in step S808, and substituted into the variable C. Thus, when the value in the variable A is negative, the 2's complement is taken of the value obtained in step S806, because the calculating function of the CPU 1 cannot multiply signed values. Consequently, the calculations from steps S805 to S806 are performed using positive values only. Thereafter, in step S807, when A was negative, the value in the variable C is returned to its negatively signed state by taking the 2's complement of C in step S808. Next, the value in the variable C is substituted into the correcting lens target velocity VC, and the correcting lens target velocity calculation process ends in step S810. Thereafter, the process returns to step S503 in FIG. 3.

In accordance with the second preferred embodiment, the variable A is signed 16-bit data, and the variable K is unsigned 16-bit data. Because the CPU 1 is equipped with an unsigned 16-bit data by unsigned 8-bit data multiplying function, the process of separating K into upper 8 bits and lower 8 bits is unnecessary. Moreover, the multiplication of 16 bits and 16 bits only uses two multiplications as opposed to the four required in the prior art. Thus, the correcting lens target velocity calculation process, in accordance with the second preferred embodiment of the present invention, is simpler than the same process in accordance with the prior art. Further, because the multiplying function built into the CPU 1 is used, the processing time of the correcting lens target velocity calculation process is shortened, while maintaining the required degree of accuracy.

Although the second embodiment of the present invention has been described with respect to a specific configuration, it will be recognized that the second embodiment is not limited to the specific configuration. For example, although the second embodiment has been described with respect to a specific configuration of using a multiplying function for use with unsigned 16-bit data by unsigned 8-bit data, one of ordinary skill in the art will recognize that a multiplying function for use with signed 16-bit data and unsigned 8-bit data, may be used. In such a case, the determination of whether the variable A is positive or negative and the process of calculating the absolute value of the variable A become unnecessary. Further, the process of taking the 2's complement of the result C, if A was negative, is eliminated.

Further, while the second preferred embodiment has been described with respect to the vibration detection circuit 5 detecting the angular velocities arising in the camera using a pair of angular velocity sensors, the second preferred embodiment is not limited to these. For example, as described with respect to the first embodiment, the sensors used as the vibration detection circuit 5 may output signals indicating either the acceleration or the position of the correcting lens 8.

Moreover, while the second preferred embodiment has been described with respect to the use of a compensating lens 8, a variable vertex angle prism or the like may instead be used. It is also possible to use a voice coil or the like instead of the motor 4.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A control unit for a vibration compensation device for use in an optical imaging system comprising:

a multiplying unit adapted to multiply 8-bit data by 16-bit data.

2. The control unit, as set forth in claim 1, wherein said multiplying unit is adapted to multiply 16-bit data by 16-bit data.

3. A control unit for a vibration compensation device for use in an optical imaging system comprising:

a multiplying unit adapted to multiply signed 8-bit data by unsigned 16-bit data.

4. A control unit for a vibration compensation device for use in an optical imaging system comprising:

a multiplying unit adapted to multiply unsigned 8-bit data by signed 16-bit data.

5. A control unit for a vibration compensation device for use in an optical imaging system comprising:

a multiplying unit adapted to multiply signed 8-bit data by signed 16-bit data.

6. A control unit for a vibration compensation device for use in an optical imaging system comprising:

a multiplying unit adapted to multiply signed 16-bit data by unsigned 16-bit data.

7. A control unit for a vibration compensation device for use in an optical imaging system comprising:

a multiplying unit adapted to multiply signed 16-bit data by signed 16-bit data.

8. A vibration compensation device for an optical imaging system comprising:

a correcting lens adapted to change the optical axis of the optical imaging system;

a correcting lens drive unit adapted to move said correcting lens perpendicular to the optical axis of the optical imaging system;

a vibration detection unit to detect vibrations in the optical imaging system and output a signal indicative of the vibrations; and a control unit adapted to control said correcting lens drive unit to move said correcting lens to compensate for vibrations detected by said vibration detection unit, said control unit being equipped with a multiplying unit adapted to multiply signed data of at least 8-bits by 16-bits.

9. The vibration compensation device, as set forth in claim 8, wherein said multiplying unit is adapted to multiply 16-bit data by 16-bit data.

10. The vibration compensation device, as set forth in claim 8, further comprising:

an A/D converter for converting an analog signal to a digital signal, said A/D converter having an analog input and a digital output, the analog input being connected to the vibration detection unit and the digital output being connected to the control unit.

11. The vibration compensation device, as set forth in claim 10, wherein said A/D converter has at least 10 bits of resolution.

12. The vibration compensation device, as set forth in claim 10, wherein said A/D converter has a sampling rate no greater than 2 ms.

13. The vibration compensation device, as set forth in claim 10, wherein said vibration detection unit outputs an analog signal indicative of the acceleration of said correcting lens.

14. The vibration compensation device, as set forth in claim 10, wherein said vibration detection unit outputs an analog signal indicative of the velocity of said correcting lens.

15. The vibration compensation device, as set forth in claim 10, wherein said vibration detection unit outputs an analog signal indicative of the position of said correcting lens.

16. A method of correcting for vibrations in an optical imaging system comprising:

detecting vibrations in the optical imaging system;

outputting an analog signal indicative of the vibrations in the optical imaging system;

converting the analog signal into a digital signal having at least 10 bits of resolution;

transforming the digital signal into data having a length of 16 bits;

determining a target velocity for a compensating lens based on the data by using a multiply function able to multiply 16-bit data by 16-bit data;

detecting a current velocity of the compensating lens;

determining a drive amount the compensating lens must be driven based on the target velocity and the current velocity; and driving the compensating lens based on the drive amount.

17. A method, as set forth in claim 16, wherein said step of determining a target velocity comprises:

determining a target velocity for a compensating lens based on the data by using a multiply function able to multiply 16-bit data by 8-bit data.

18. A method of correcting for vibrations in an optical imaging system comprising:

detecting vibrations in the optical imaging system;

outputting an analog signal indicative of the vibrations in the optical imaging system;

converting the analog signal into a digital signal having at least 10 bits of resolution;

transforming the digital signal into data having a length of 16 bits;

determining a target velocity for a compensating lens based on the data by using a multiply function able to multiply signed 16-bit data by 16-bit data;

detecting a current velocity of the compensating lens;

determining a drive amount the compensating lens must be driven based on the target velocity and the current velocity; and driving the compensating lens based on the drive amount.

19. A method of correcting for vibrations in an optical imaging system comprising:

detecting vibrations in the optical imaging system;

outputting an analog signal indicative of the vibrations in the optical imaging system;

converting the analog signal into a digital signal having at least 10 bits of resolution;

transforming the digital signal into data having a length of 16 bits;

determining a target velocity for a compensating lens based on the data by using a multiply function able to multiply 16-bit data by signed 8-bit data;

detecting a current velocity of the compensating lens;

determining a drive amount the compensating lens must be driven based on the target velocity and the current velocity; and driving the compensating lens based on the drive amount.

* * * * *